R. G. HOUSDORFER.
METHOD OF MANUFACTURING AXLES.
APPLICATION FILED AUG. 18, 1919.
1,385,998.
Patented Aug. 2, 1921.
2 SHEETS—SHEET 1.
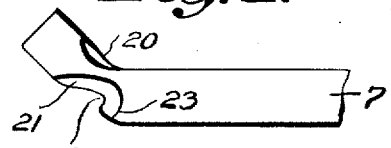
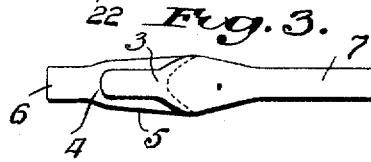
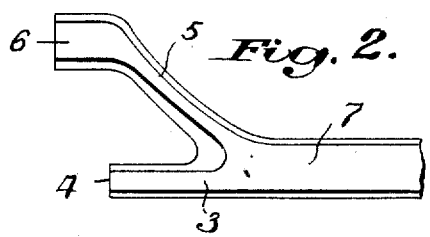
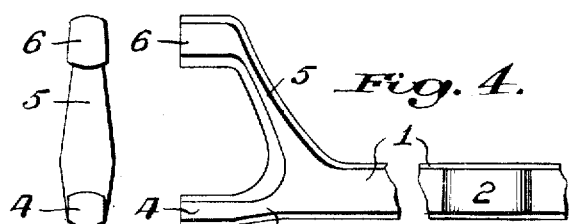
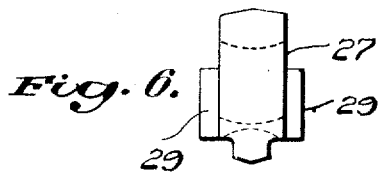
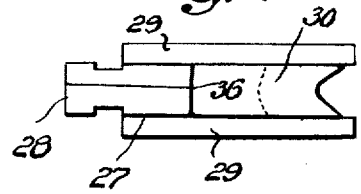
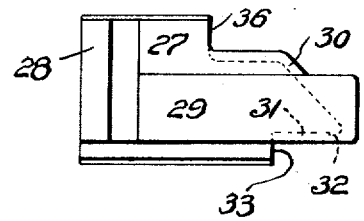
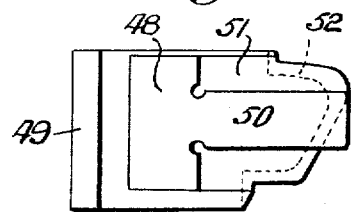
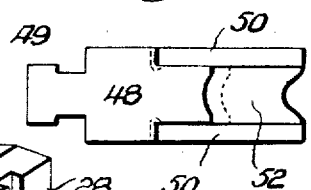
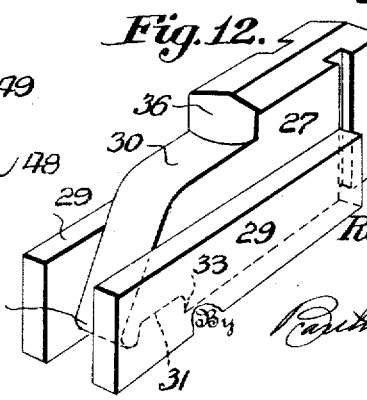
Inventor
Reinhold G. Housdorfer,
by
Attorneys R. G. HOUSDORFER.
METHOD OF MANUFACTURING AXLES.
APPLICATION FILED AUG. 18, 1919.
1,385,998.
Patented Aug. 2, 1921.
2 SHEETS—SHEET 2.
Fig. 13.
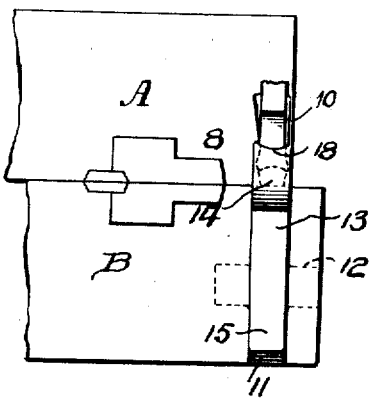
Fig. 14.
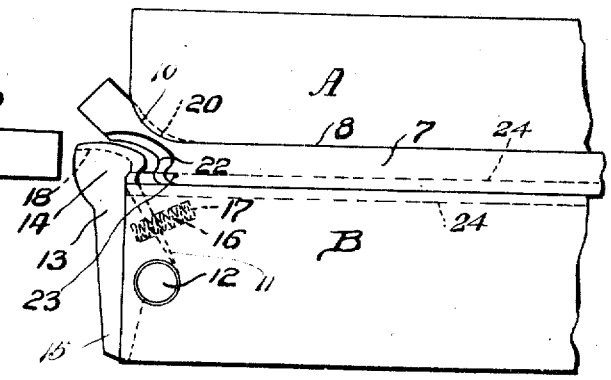
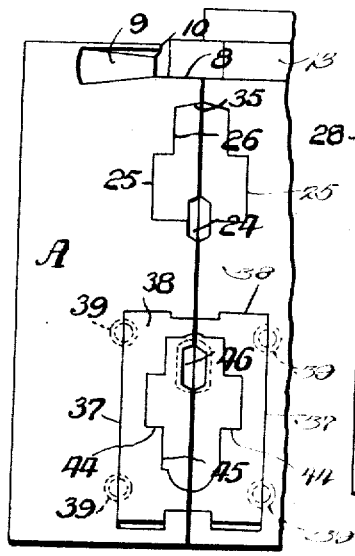
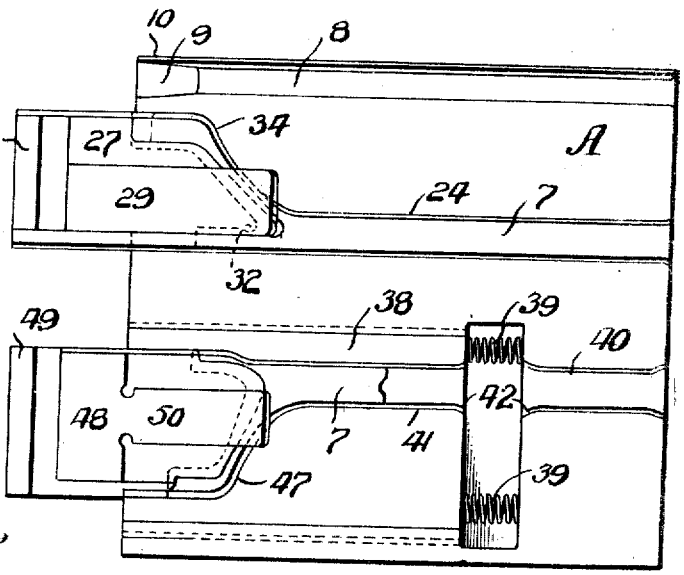
Fig. 15.
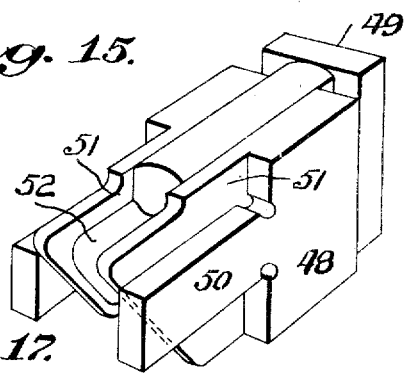
Fig. 16.
Fig. 17.
Inventor
Reinhold G. Housdorfer,
By
Attorneys

UNITED STATES PATENT OFFICE.

REINHOLD G. HOUSDORFER, OF DETROIT, MICHIGAN.

METHOD OF MANUFACTURING AXLES.

1,385,998. Specification of Letters Patent. Patented Aug. 2, 1921.

Application filed August 18, 1919. Serial No. 318,320.

*To all whom it may concern:*

Be it known that I, REINHOLD G. HOUSDORFER, a citizen of the United States of America, residing at Detroit, in the county of Wayne and State of Michigan, have invented certain new and useful Improvements in Methods of Manufacturing Axles, of which the following is a specification, reference being had therein to the accompanying drawings.

In forming axles with the dies disclosed in my Patent No. 1,050,460, granted Jan. 14, 1913, I had difficulty in preventing the formation of a fin, on the second upset or operation, which, when formed, is hard to remove. To prevent the formation of this fin and make a better axle is the main object of this invention, which is accomplished by a method of manufacture involving dies of novel construction.

Another object of this invention is to form the ends of an axle so that the grain of the metal will be toward the end of the yoke or fork members so as to resist, as much as possible, breakage of the axle members. This object is attained by constructing the forming apparatus so that when the ends of the axle are upset and formed, the metal is caused to flow in directions which avoid any abrupt bends, thus preserving as much as possible, the tensile strength of the metal so as to resist to a high degree the stresses and strains to which the forks or yokes of the axle may be subjected when forming part of a vehicle.

A further object of my invention is to provide a method of manufacturing axles wherein the steps or operations may be successively performed with a degree of accuracy that insures a minimum amount of waste, and as illustrating one manner of carrying my invention into effect, I will describe, with the assistance of the accompanying drawings, dies and a method as now practised by me.

In the drawings,

Figure 1 is a side elevation of one end of an axle bar or blank showing the same as formed by the first step of this method;

Fig. 2 is a similar view of the axle bar or blank, after being formed by the second step or operation of this method;

Fig. 3 is a bottom plan of the same;

Fig. 4 is a side elevation of a portion of the axle, showing the same as completed by the third step of this method;

Fig. 5 is an end view of the same;

Fig. 6 is a view of the inner end of the punch or die used during the second step or operation of the method;

Fig. 7 is a plan of the same;

Fig. 8 is a side elevation of the punch or die;

Fig. 9 is a similar view of another punch or die used during the third or final step involved in the method;

Fig. 10 is a plan of the same;

Fig. 11 is a view of the outer end of the punch or die shown in Figs. 9 and 10;

Fig. 12 is a perspective view of the punch or die shown in Figs. 6, 7 and 8;

Fig. 13 is an end view of dies showing the portions thereof used during the first step or operation of the method;

Fig. 14 is a plan of the same;

Fig. 15 is an end view of one of the dies;

Fig. 16 is a side elevation of the same showing punches or movable dies relative thereto, and Fig. 17 is a perspective view of the punch or die shown in Figs. 9, 10 and 11.

Considering the articles to be produced by this method of manufacture, reference will first be had to Figs. 4 and 5 showing one end of an axle 1 having a spring perch 2 and a fork or yoke composed of a lower fork member 3 terminating in a knuckle bearing 4, and an upper fork member 5 terminating in a knuckle bearing 6. The fork members and the bearings or extremities thereof are formed by upsetting and bifurcating the end of the axle bar and to accomplish this it is necessary to use dies which will insure a proper distribution of the metal to prevent the formation of fins, webs, and other protuberances which would necessitate further operations for a finished product, as far as this invention is concerned. To make the axle end by three distinct operations which may be successively carried on and thus insure an economical and expeditious production, it is necessary to use two dies generally designated A and B and these dies may be movable relative to each other, or the die A considered stationary and the die B as movable. In either instance the movement is sufficient to permit of a piece of stock, in the form of a bar 7, as shown in Figs. 1, 13 and 14, being placed between the dies. The die A has its upper inner edge provided with a longitudinal recess 8 to receive the bar 7 so that said bar may be clamped in position, with one end of the bar protruding from the dies, when said dies are brought together. At that end of the die A from which the extremity of the bar 7 protrudes the recess 8 is flared or enlarged, as at 9 with an overhanging lip or ledge 10, and this portion of the recess 8 is concave, from the lip or ledge 10 to the body of the die.

The die B extends beyond the die A and has an end thereof recessed, as at 11, in a plane with the recess 8 and pivotally mounted in said recess by a pin 12 or other pivotal means is an upsetting tool or die 13 having a head 14 protruding from the inner face of the die B, adapted to impinge against the protruding end of the bar 7 when the dies A and B are brought together. The tool or die 13 is pivoted intermediate its ends so that its end 15 may abut the die B and limit the outward movement of the head 14, which is maintained normally in its outermost position by a coiled expansion spring 16 placed in confronting recesses 17 in the die B and the tool 13. The head 14 of the tool 13 has a concave forming face 18, and assuming that the bar 7 has been placed in the recess 8 of the die A and the die B shifted toward the bar, then the head 14 of the tool impinges against the protruding end of the bar and forces it into the flared end 9 of the recess 8. The protruding end of the bar is therefore disposed at an angle to the clamped portion of the bar 7 and the head 14 of the tool 13 is practically in the axis of said bar. The head 14, which is still in an open or extended position, may now be struck by a punch or blow head 19 and forced inwardly against the angularly disposed end of the bar to upset the same. In the first part of this operation, when the protruding end of the bar is bent at an angle to the clamped body of the bar, the action of the tool 13 is sustained by its pivot pin and the outer end of the tool bearing against the die. When a blow is delivered on the head 14 to upset the angular end the bar the tool turns on its pivot and enters the outer end of the recess 8 to the extent of crowding the end of the bar in the end of the recess, so that the outer end of the bar has a shape imparted thereto along the lines suggested in Fig. 1. In this figure it will be observed that the end of the bar is now disposed at an obtuse angle relative to the body of the bar and that at the inner bend the bar has received a rounded surface 20 and at the outer bend a rounded surface 21 which has also been concaved, as at 22 thus reducing the cross sectional area at the bend of the bar, leaving a protuberance 23 that ultimately results in the lower fork member 3 of the axle.

The first operation may be considered as having been performed at the top or in the upper portions of the dies A and B, and the second operation takes place between the dies A and B below the location of the first operation. The confronting faces of the dies A and B, have longitudinal grooves or recesses 24 to receive the bar 7 and the forward ends of the grooves or recesses 24 terminate in large recesses 25 and 26 both of which coöperate in providing guideways for a punch head or movable die shown in Figs. 6, 7, 8 and 12. The punch head or movable die is adapted to be reciprocated to slide in and out of the recesses 25 and 26 and the head or die comprises a body 27 having a coupling member 28 by which the body is reciprocated to and from the dies A and B, and at the sides of the body 27 are guides 29 which fit in the recesses 25 while the body 27 extends into the recesses 26. The body 27 is consequently of greater depth than the guides 29 and said body is cut away to provide a concave and undercut forming face 30, said forming face being undercut, as at 31, between the guides 29 so as to form a nose 32 and the sharpness or bluntness of this nose determines to a great extent the compression or upsetting of the bar 7 between the dies A and B. The angle of the forming face 30 also determines the extent of the upsetting coöperation between the dies and the punch head, and assuming that the bar 7 has been transferred from the recess 8 to the grooves 24 and clamped between the dies A and B, the following is accomplished by the punch-head:—As the punch body 27 enters the closed dies A and B, the nose 32 engages in the concavity 22 of the bar 7 and as pressure is brought to bear on the end of the bar the protuberance 23 is elongated in the grooves 24 until it abuts the shoulder 33 formed by undercutting the body 27, as at 31, thus producing the lower fork member 3 of the axle. The concave forming face 30 confronts a somewhat similar face 34 of the dies A and B and the angularly disposed end of the bar is crowded upwardly or elongated in its angular direction until it impinges the upper longitudinal walls 35 of the dies A and B. when the upper end of the bar is forced outwardly on the forming face 30 to abut the shoulder 36 of the punch body 27, thus forming the upper fork member 5 at an acute angle relative to the lower fork member 3, as shown in Fig. 2. During this operation, the upper and lower fork members receive convex surfaces imparting a desired cross sectional area or shape to the fork members.

The third operation on the end of the axle takes place between the lower portions of the dies A and B which are especially constructed somewhat along the lines suggested in my former Patent No. 1,050,460. As shown in Figs. 15 and 16 the confronting faces of the dies A and B are provided with guideways 37 for slidable spring pressed and yieldable dies 38, said dies being held normally extended by springs 39 suitably placed in the inner ends of the guideways 37. The confronting faces of the dies A and B are formed with grooves 40 to receive the bar 7, and the slidable dies 38 have the confronting faces thereof formed with grooves 41 alining with the grooves 40, said grooves 40 and 41 having the confronting ends thereof flared, as at 42 so that the slidable dies 38 may coöperate with the dies A and B in forming the spring perch 2. The perch may be formed simultaneously with the last operation or at any other time.

The sliding dies 38 have the outer ends thereof recessed to provide guideways 44 and 45, grooves 46 to receive the lower fork member of the axle, and grooves 47 to receive the upper fork member of the axle, said axle being inverted or turned over when placed in the grooves 40 and 41.

Another reciprocable punch head or die is now used to further shape the yoke or fork of the axle as held in the sliding dies 38. The reciprocable punch head or die, as shown in Figs. 9, 10, 11 and 15 is constructed somewhat similar to the punch head or die body 27. There is a body 48 having a coupling member 49; guides 50 slidable in the guideways 44; guides 51 slidable in the guideways 45, and a nose 52 between the guides 51, said nose being concave and undercut with its angularity more steep than the angularity of the nose 30, so that when the punch or die body 48 enters the dies A and B, between the sliding dies 38, the upper fork member of the axle will be driven inwardly to assume a greater angle relative to the lower member, as shown in Fig. 4, than the angle produced by the second operation and shown in Fig. 2. This bending and further shaping of the upper fork member takes place as the sliding dies recede and the knuckle bearing of the upper fork member is brought into alinement with the lower fork member, the alinement being in a vertical plane so that a knuckle may be eventually journaled in the throat formed by the axle yoke or fork.

All three operations are carried on during the initial heat of the axle bar and it is during the second and third operations that flashing of the metal is prevented by the conformation of the various dies, consequently it is practically impossible for fins or other rough surfaces to be formed on the finished axle yoke. The formation of the perch 2 may be during the third operation on the axle bar or during the second operation, and for this reason, I do not care to confine my method to any particular time of perch formation or to the manner in which such formation is accomplished, as my invention particularly resides in the formation of the end of the axle bar beyond the spring perch.

Summarizing the various steps of the method in their sequence; first, the axle blank is clamped between dies and during the clamping of said axle blank the end of the blank is bent at an angle to the body of the blank by an instrumentality carried by one of the dies and this instrumentality serves another purpose after the end of the blank is bent.

Second, with the bent blank clamped between the dies the instrumentality is struck a blow which causes it to recess the bent end of the blank at the large bend thereof, the recessing of the angular end of the blank reducing its cross sectional area and disributing the metal into embryo portions each of which is susceptible to elongation.

Third, the blank having a recessed angular end is re-positioned between the same dies and a punch head or movable die is brought into action to subject the angular recessed end of the blank to further pressure and this time the embryo portions of the blank are elongated and further developed toward a fork formation. This is accomplished by three dies coöperating and with the blank receiving portions of the dies properly shaped the fork portions may have a desired shape and cross sectional area imparted thereto.

Fourth, the axle blank with its fork portions is transferred to other portions of the dies and another punch head or movable die employed to accomplish two operations, namely, that of straightening up and properly alining the fork portions of the axle blank, and producing a perch on the axle blank adjacent the fork thereof.

This operation is accomplished through the novel construction of the dies and while the perch is formed simultaneously with the completion of the fork, yet it is possible to perform these operations separately in slow production.

From the above it will be observed that there is a novel coöperation of the dies for performing the various steps or operations of my improved method, yet, separate dies, independent devices, or other means may be employed, consequently, I do not care to confine my invention to any specific device or instrumentality for carrying the same into effect, other than defined by the appended claims.

What I claim is:—

1. A method of manufacturing an axle from a blank, consisting in bending the end of the blank at an angle, pressing the angular blank end to reduce its cross sectional area, and then re-shaping the blank end while the blank is held between dies.

2. A method of manufacturing an axle from a blank, consisting in reducing the end of the blank to reduce its cross sectional area and form an angular end with a protuberance, pressing the angular blank end to elongate it and the protuberance thereof, and then re-shaping the elongated portions of the blank.

3. A method of manufacturing an axle from a blank, consisting in reducing the end of the blank to form an angular end with a protuberance and with a reduced portion between said protuberance and the angular blank end, pressing the angular blank end to elongate the angular blank end to form an upper fork member, and the protuberance thereof to form a lower fork member, and then pressing the upper fork member to place its extremity in parallelism with the extremity of the lower fork member.

4. A method of manufacturing an axle from a blank, consisting in simultaneously bending the end of an axle blank and providing its outer bent surface with a recess, pressing the angular blank end at its recess to elongate a wall of the recess in the blank end, and then further bending the blank end.

5. A method of providing an axle with a yoke consisting of the following successive operations, first, bending an axle blank by lateral pressure to form an angularly disposed end; second, bringing pressure to bear on the angularly disposed blank end to form a protuberance at the juncture of the angularly disposed end and the blank; and third, elongating the protuberance and the angularly disposed blank end to form fork members.

6. A method of manufacturing an axle from a blank, consisting in bringing lateral pressure to bear on the end of the blank to provide an angularly disposed blank end, bringing pressure to bear in the direction of the axle blank to recess the angularly disposed blank end and form a protuberance, pressing the angular blank end at its recess to elongate walls of the recess and form fork members, and then re-shaping the blank end while the blank is held between dies to properly aline the fork members.

7. A method of manufacturing an axle from a blank, consisting in pressing the end of the blank to provide a recess having one wall of greater length than the other, bringing further pressure to bear at the recess of the blank to elongate the recess walls to form upper and lower fork members so that one member has its extremity beyond the other, and then re-shaping the upper and lower fork members to place the extremities of the fork members in parallelism.

8. A method of manufacturing an axle from a blank, consisting in clamping the blank between dies, using an instrumentality to bend the blank as the dies are brought together, using the same instrumentality to recess the bent portion of the blank while held by the dies, and then re-shaping the end of the blank.

9. A method as characterized in claim 8, wherein the instrumentality is carried by one of the dies to bend the blank end and then is moved in a direction axially of the blank to recess the bent portion of the blank.

10. A method of manufacturing an axle from a blank prior to providing the axle with a perch, consisting of causing dies to bend an end of the blank and reduce its cross sectional area at the bend to distribute the metal of the blank into embryo fork portions each of which is susceptible to elongation, then bringing pressure to bear on the end of the blank between the embryo fork portions while the blank is held by the dies to cause the embryo fork portions to elongate and further develop toward a fork formation and then subjecting the end of the blank to further pressure while held by the dies, such pressure simultaneously causing the dies to complete the formation of the axle fork and provide the axle blank with a perch adjacent the axle fork.

In testimony whereof I affix my signature in the presence of two witnesses.

REINHOLD G. HOUSDORFER.

Witnesses:
KARL H. BUTLER,
CHAS. W. STAUFFEGER.